United States Patent
Rope et al.

(10) Patent No.: US 8,667,246 B2
(45) Date of Patent: Mar. 4, 2014

(54) SYSTEM FOR VIRTUAL DISKS VERSION CONTROL

(75) Inventors: Julien Rope, Les Ulis (FR); Philippe Auphelle, Chatillon (FR); Yves Gattegno, L'Hay les Roses (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 13/320,272

(22) PCT Filed: May 13, 2009

(86) PCT No.: PCT/US2009/043843
§ 371 (c)(1), (2), (4) Date: Nov. 13, 2011

(87) PCT Pub. No.: WO2010/132055
PCT Pub. Date: Nov. 18, 2010

(65) Prior Publication Data
US 2012/0060004 A1 Mar. 8, 2012

(51) Int. Cl.
*G06F 12/00* (2006.01)
(52) U.S. Cl.
USPC ........... 711/168; 711/148; 711/150; 711/154; 709/213; 709/214; 709/216
(58) Field of Classification Search
USPC .......... 711/148, 150, 154, 168; 709/213, 214, 709/216
See application file for complete search history.

(56) References Cited

U.S. PATENT DOCUMENTS

| 5,819,292 A | 10/1998 | Hitz et al. |
| 6,795,966 B1 | 9/2004 | Lim et al. |

(Continued)

FOREIGN PATENT DOCUMENTS

| CA | 2634356 | 6/2007 |
| CN | 1483164 | 3/2004 |

(Continued)

OTHER PUBLICATIONS

"Information about Soft Updates, Snapshots, and Back-ground Fsck," http://www.mckusick.com/softdep/index.html, as accessed 2009 (1 pg).

(Continued)

*Primary Examiner* — John Lane

(57) ABSTRACT

A system (10) for virtual disks version control includes a selectively read-only volume (12); at least one topmost overlay ($14_1$, $14_2$, $14_3$, $14_4$, $14_5$); and at least two intermediate, selectively read-only overlays (16, 16', 16", 16''') configured as at least two mounting points. The at least one topmost overlay ($14_1$, $14_2$, $14_3$, $14_4$, $14_5$) is configured to store the results of redirected write operations. One of the at least two mounting points (16, 16', 16", 16''') and the volume (12) form an image, and the other of the at least two mounting points (16, 16', 16", 16''') and the volume (12) form another image. The at least two intermediate overlays (16, 16', 16", 16''') are operatively located between the volume (12) and the at least one topmost overlay ($14_1$, $14_2$, $14_3$, $14_4$, $14_5$). Each of the at least two mounting points (16, 16', 16", 16''') is configured to enable a plurality of client computers (18) to concurrently read the image or the other image and to concurrently write to a respective one of the at least one topmost overlays ($14_1$, $14_2$, $14_3$, $14_4$, $14_5$).

15 Claims, 2 Drawing Sheets

(56) References Cited

U.S. PATENT DOCUMENTS

| | | | |
|---|---|---|---|
| 6,857,001 | B2 | 2/2005 | Hitz et al. |
| 6,892,211 | B2 | 5/2005 | Hitz et al. |
| 6,954,852 | B2 | 10/2005 | Burokas et al. |
| 6,990,573 | B2 | 1/2006 | Cherian et al. |
| 7,043,614 | B2 | 5/2006 | Umbehocker et al. |
| 7,174,352 | B2 | 2/2007 | Kleiman et al. |
| 7,174,451 | B2 | 2/2007 | Zimmer et al. |
| 7,197,516 | B1 | 3/2007 | Hipp et al. |
| 7,321,936 | B2 | 1/2008 | Zimmerman et al. |
| 7,356,679 | B1 | 4/2008 | Le et al. |
| 7,457,982 | B2 | 11/2008 | Rajan |
| 7,865,579 | B2 | 1/2011 | Birse et al. |
| 2006/0179261 | A1 | 8/2006 | Rajan |
| 2007/0143459 | A1 | 6/2007 | Batteram |
| 2007/0266027 | A1 | 11/2007 | Gattegno et al. |
| 2008/0082593 | A1 | 4/2008 | Komarov et al. |
| 2010/0235831 | A1* | 9/2010 | Dittmer .............................. 718/1 |

FOREIGN PATENT DOCUMENTS

| | | |
|---|---|---|
| CN | 1688981 | 10/2005 |
| CN | 1900914 | 1/2007 |
| CN | 1977253 | 6/2007 |
| CN | 101356500 | 1/2009 |
| WO | WO-0193016 | 12/2001 |
| WO | WO-2005101201 | 10/2005 |
| WO | WO-2008008325 | 1/2008 |

OTHER PUBLICATIONS

DENX Software Engineering, http://www.denx.de/wiki/bin/view/Know/MiniFOHome, 2007 (3 pgs).

DENX Software Engineering, http://www.denx.de/wiki/DULG/OverlayFileSystems, 2006 (4 pgs).

Fegreus, "Real Magic with Virtual Snapshots," http://www.open-mag.com/100348.shtml, 2008 (7 pgs).

http://en.wikipedia.org/wiki/Btrfs, last accessed 2009 (3 pgs).

http://en.wikipedia.org/wiki/Ext3cow, last accessed 2009 (2 pgs).

http://en.wikipedia.org/wiki/Write$_{13}$ Anywhere$_{13}$ File$_{13}$ Layout, last accessed 2009 (2 pgs).

Xiao, et al., "Implementation and Performance Evaluation of Two Snapshot Methods on iSCSI Target Storages," http://www.ele.uri.edu/Research/hpcl/2006/MSST.pdf (11 pgs).

Ironkey, "The mini$_{13}$ fo filesystem," http://lwn.net/Articles/135283, 2005 (4 pgs).

Nehring, L. S., Overlay writable filesytem over r/o partition, http://lkml.org/lkml/1998/1/8/171, 1998 (1 pg).

Powerkil Snapshotting and The IBM XIV® Storage System Breakthrough, http://www.xivstorage.com, last accessed 2009 (2 pgs).

Mount$_{13}$ http://en.wikipedia.org/wiki/Mount$_{13}$ (computing), last accessed 2009 (2 pgs).

Overlay Filesystem Home Page, http://home.comcast.net/~artn/ovlfs/ovifs.html, 2000 (9 pgs).

http://www.usenik.org/publications/library/proceedings/usenix99/full$_{13}$ papers/mckusick/mckusick.pdf, "MCKUSICK, Technique for Eliminating Most Synchronous Writes . . . " (18 pgs).

Peterson, "Ext3cow: a Time-Shifiting File System for Regulatory Compliance" http://hssl.cs.jhu.edul/~zachary/papers/peterson-tos05.pdg, 2005 (21 pgs).

Linux Software Map: Overlay Filesystem, http://www.boutell.com/lsm/lsmbyid.cgi/00137, 1998 (2 pgs).

ZFS, http://en.wikipedia.org/wiki/ZFS, last accessed 2011 (18 pgs).

McKusick, M. K., "Running "fsck" in the Background," http://www.usenix.org/publications/library/proceedings/bsdcon02/mckusick.html, 2002.

WindowsXP, Use System Restore to Undo Changes if Prob Occur, last accessed 2009; http://www.micorsoft.com/windowsxp/using/helpandsupport/learnmore/systemrestore.mspx (2 pgs).

VMware Technical Note, "Virtual Disk Format 1.0," 2006 (13 pages).

Rhodes, T., "File System Snapshots," http://www.freebsd.org/doc/en/books/handbook/snapshots.html, last accessed 2009 (2 pgs).

Seltzer, "Journaling VS Updates: Asynchronous Meta-data Protection in File Sys" http://www.usenix.org/publications/library/proceedings/usenix2000/general/seltzer.html(15 pgs).

The Layered File System, http://users.cs.cf.ac.uk/O.F.Rana/os/lectureos11/node3.html, 1997 (1 pg).

Versioning file system., http://en.wikipedia.org/wiki/Versioning$_{13}$ file$_{13}$ system, last accessed 2009 (4 pgs).

Klotzbücher, M., "Development of a Linux Overlay Filesystem for Software Udates in Embedecl Systems," http://www.denx.de/static/Diplomarbeit-MK-1.0-net.pdf, 2004 (71 pgs).

Overlay Filesystem project, http://www.ovlfs.sourceforge.net, 2003, (5 pgs).

ISA, International Search Report dated Dec. 30, 2009, PCT/US2009/043843 filed May 13, 2009.

* cited by examiner

US 8,667,246 B2

SYSTEM FOR VIRTUAL DISKS VERSION CONTROL

CROSS-REFERENCE TO RELATED APPLICATION

This application claims priority to PCT Patent Application Ser. No. PCT/US2009/043843, which was filed on May 13, 2009 which is herein included by reference in its entirety for all purposes.

BACKGROUND

The present disclosure relates generally to a system for virtual disks version control.

Virtual disks give client computers enhanced versatility with ease of configuration when compared to typical hard drive technology. The information contained in a virtual disk is ultimately stored in a form of computer memory, but virtualization allows client computers to operate on images that are not bound by some of the physical limitations of hard drives. New data is generally added to the virtual disk, and upper level software is used to control which data is accessed by the client computer for operation. With such disks, data is generally written one time. As such, once data is written, a user generally may not return to a previous state without relying upon upper level software.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiments of the system and computer readable medium disclosed herein enable virtual disks version control, by advantageously including multiple mounting points on top of a common volume that can be accessed and used concurrently by several different client computers (I.e., physical or virtual computers). Such concurrent use may be simultaneous as long as the server can accept simultaneous connection requests, for instance, if the server has several network interface cards, and/or several CPUs/Cores. Such concurrent use may also encompass the server sequentially processing the client computers' requests to read/write data from/to the virtual disks. As such, concurrent/concurrently as used herein means that one client computer does not have to dismount from the virtual disk in order to allow another client computer to mount that virtual disk.

When the mounting points are a system disk, the client computer(s) is/are allowed to boot and run a selected operating system from one of the mounting points, Furthermore, the system includes topmost overlays that enable the client(s) to store different modifications of the disk, and the system also enables the client(s) to revert (forward or backward) to any one of the saved modifications. As such, the system enables the client(s) to build separate changes (i.e., different modifications based on the same disk), and then provides the client (s) with the ability to select which version of the disk is to be used at any given time. Such advantages are accomplished without having to re-image the disk at any time.

Other advantages of embodiment(s) of the system and computer readable medium disclosed herein include providing flexibility on the disk or disk images and providing the ability to have multiple versions of a disk accessible at the same point and at the same time (rather than modifying the disk, and then forcing an administrator to use imaging tools to deploy the installation).

Further advantages include shared virtual disks that offer more than one mounting point per virtual disk; and enable concurrent use of a mounting point (i.e. virtual disk) by two or more client computers. The client computers boot to see the virtual drives.

Embodiment(s) of the present disclosure operate with disks (e.g., sector-based, also known as raw devices or block devices). As such, embodiment(s) of the present disclosure may be used with any file system that is supported by the client operating system (OS). Some non-limiting examples of operating systems suitable for use with the present system 10 and computer readable medium 20 include FAT12, FAT16, FAT32, NTFS, Ext2, and Ext3.

Embodiment(s) of the present system 10/computer readable medium 20 are in contrast to systems that are aimed at providing (restoring/reverting to) several versions of a disk drive or a file system or a set of files, such as with some storage systems.

Figure 1:
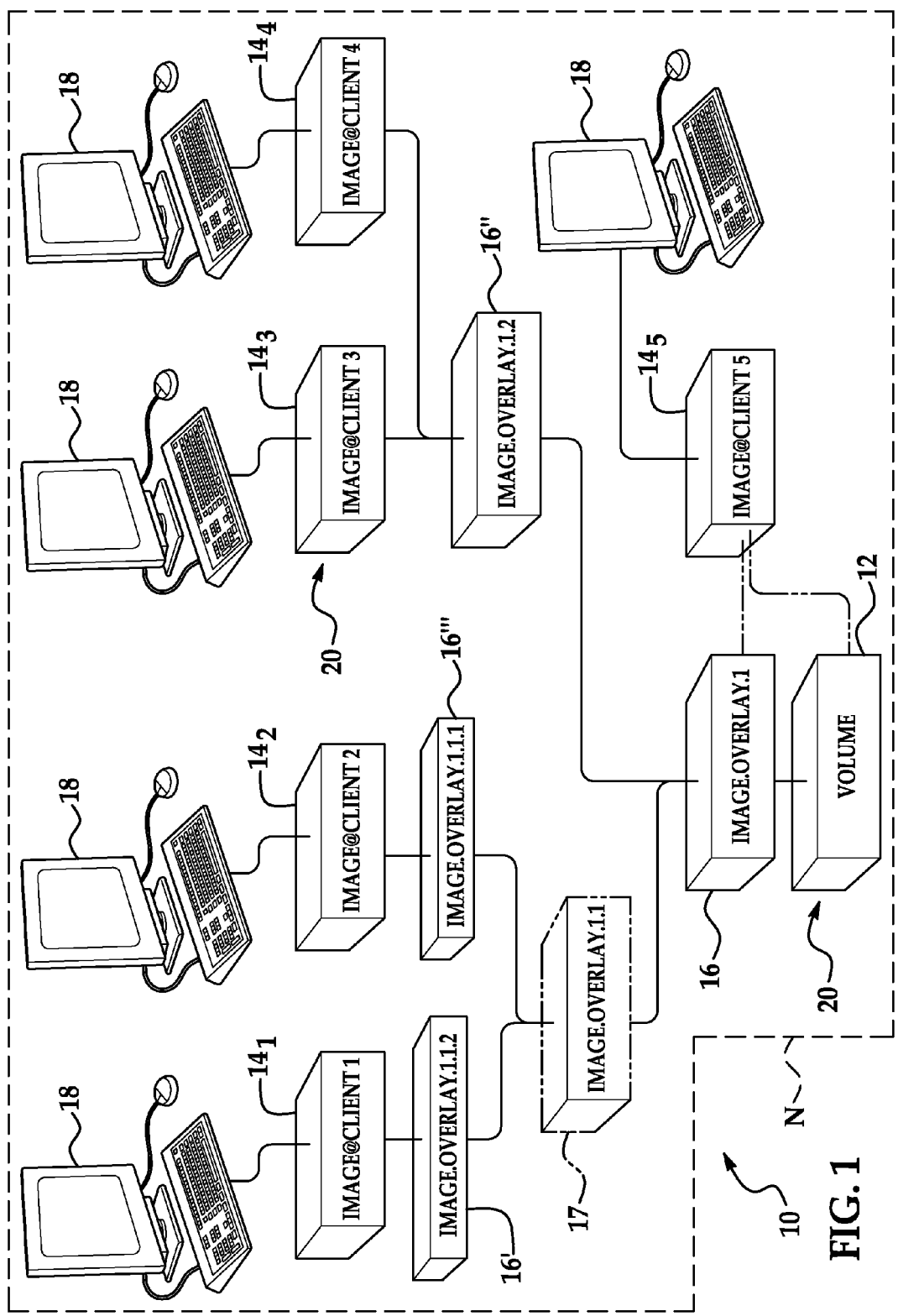
FIG. 1 is a schematic diagram of an embodiment of a system for virtual disks version control.

Referring now to FIG. 1, an embodiment of a system 10 for virtual disks version control is depicted. The system 10 includes a selectively read-only volume 12, at least one topmost overlay $14_1$, $14_2$, $14_3$, $14_4$, $14_5$, and at least two intermediate, selectively read-only overlays 16, 16', 16", 16''' operatively located between the volume 12 and the topmost overlay(s) $14_1$, $14_2$, $14_3$, $14_4$, $14_5$.

The volume 12 functions as the base disk or disk image of the system 10. The volume 12 is common to all of the intermediate overlays 16, 16', 16", 16''' and topmost overlays $14_1$, $14_2$, $14_3$, $14_4$, $14_5$, and thus it is desirable that the volume 12 be read-only. It is to be understood that the volume 12 may be made writeable during merge operations (discussed below) if such merging is desirable, but a client 18 will still write in its own respective topmost overlay $14_1$, $14_2$, 141, $14_4$, $14_5$ during such merging. If an embodiment of the volume 12 is altered other than in a merge operation, the overlays (e.g., any of the intermediate 16,16',16",16''',17 or topmost overlays $14_1$, $14_2$, $14_3$, $14_4$, $14_5$) that depend on it generally become meaningless and may be discarded.

It is to be understood that any of the overlays (intermediate, additional (discussed below), topmost) and the volume 12 contain sectors of disk. Data that can be fetched from the sectors in any of the overlays are potentially modified versions of data that can be fetched from sectors that are also available in the volume 12. When a read operation is made to an image, the sectors that are available in the higher overlay have a higher priority than the same sectors that appear in the lower overlays or the volume 12. For instance, considering FIG. 1, if sector #64 is available to client 2 in topmost overlay $14_2$, in intermediate overlay 16 and in volume 12, a read request emitted by client 2 will actually fetch the data of sector #64 from topmost overlay $14_2$. If topmost overlay $14_2$ is erased while the client was stopped and client 2 is started again and then requests to read the data located in sector #64 without having requested first to write data to sector #64, the data in sector #64 will now be fetched from intermediate overlay 16 (as sector #64 is now unavailable in topmost overlay 14$_2$).

Each of the selectively read-only overlays 16, 16', 16", 16''' may provide a mounting point for one or more client computers 18. It is to be understood, however, that the system 10 may also include additional intermediate overlay(s) 17 that are not used as mounting points but are capable of being used as mounting points.

Those intermediate overlays 16, 16', 16", 16''', that are configured as mounting points enable the client computers 18 to concurrently (simultaneously or sequentially) read one or more images formed by one or more of the mounting points 16, 16', 16", 16''', any intermediate overlays 17 (also enabled for use as a mounting point when desired), and the volume 12. There are at least two mounting points 16, 16', 16", 16''', 17 in the system 10 (five such mounting points 16, 16', 16", 16''', 17 are shown in FIG. 1 (with mounting point 17 not being used as a mounting point in FIG. 1)). However, it is to be understood that any number of mounting points 16, 16', 16", 16''', 17 may be used. Each combination of mounting points 16, 16', 16", 16''', 17 and the volume 12 may form a different image, resulting in multiple different images formed using the system 10. As shown in FIG. 1, four different images are formed, as clients 3 and 4 share the same image (though they do not share the same client images, which respectively include the topmost overlays 14$_3$ and 14$_4$, as discussed further herein).

In one non-limiting example shown in FIG. 1, an image formed with volume 12 and mounting point 16 is different from an image formed with volume 12 and mounting points 16 and 16'. As such, multiple client computers 18 are able to concurrently read a respective one of the images. It is to be understood that each client computer 18 is enabled to read one respective image, as there is one mounting point 16, 16', 16", 16''', 17 per client computer 18 in a given stack of overlays. For example, for client 2, the image.overlay.1.1.1 is its mounting point 16'''; while for client 3, the image.overlay.1.2 is its mounting point 16".

When additional intermediate overlay(s) 17 are included, they may be operatively located in any suitable location, e.g., anywhere between the volume 12 and the topmost overlay(s) 14$_1$, 14$_2$, 14$_3$, 14$_4$, 14$_5$ (for example, just above the volume 12, or between two intermediate overlays/mounting points 16, 16', 16", 16'''). The example of the additional intermediate overlay 17 shown in FIG. 1 is located between mounting point 16 and mounting point 16'; and is also located between mounting point 16 and mounting point 16'''. The additional intermediate overlay(s) (17) form part of the image or the other image.

The respective images have the topmost overlay 14$_1$, 14$_2$, 14$_3$, 14$_4$, 14$_5$ formed thereon. The client image (as defined herein) includes all of such components. For example, the client image of the first computer client 18 in FIG. 1 includes topmost overlay 14$_1$, mounting point 16', additional overlay 17 (when present), intermediate overlay 16, and the volume 12.

Write operations performed by the respective client computers 18 to one of the it gages, are redirected to the corresponding topmost overlay 14$_1$, 14$_2$, 14$_3$, 14$_4$, 14$_5$, which is configured to store the results of such redirected write operations. The location of the topmost overlay 14$_1$, 14$_2$, 14$_3$, 14$_4$, 14$_5$ may be persistent (i.e., there is no redirection in RAM) or volatile (redirected to RAM or to the data repository that contains the written data that is erased when the client starts up (mounts the image) or stops (dismounts the image)). Such location may be selected from a portion of RAM in the client computer, a portion of RAM in a remote computer (e.g., a disk streaming server), a separate partition, a separate disk, or a file. Furthermore, this location of the topmost overlays 14$_1$, 14$_2$, 14$_3$, 14$_4$, 14$_5$ may be located on the respective client computer 18, or on a remote file server or disk-streaming solution.

The redirected write operations form a delta or intermediate state, which is also referred to herein as the topmost overlay(s) 14$_1$, 14$_2$, 14$_3$, 14$_4$, 14$_5$. These topmost overlay(s) 14$_1$, 14$_2$, 14$_3$, 14$_4$, 14$_5$ may be saved by the user and kept as a whole consistent object. It is to be understood that topmost overlay(s) 14$_1$, 14$_2$, 14$_3$, 14$_4$, 14$_5$ may become new intermediate overlays 16, 16', 16", 16''', 17, with new respective topmost overlays 14$_1$, 14$_2$, 14$_3$, 14$_4$, 14$_5$ thereover. These intermediate states are organized by the system 10 in different manners, which offer the respective client computers 18 multiple functionalities. As such, it is possible to have multiple intermediate overlays 16, 16', 16", 16''', 17 known by the system 10 at the same time. Each intermediate overlay 16, 16', 16", 16''', 17 and topmost overlay 14$_1$, 14$_2$, 14$_3$, 14$_4$, 14$_5$ may be a different customization of the same volume 12.

Embodiment(s) of the present system 10 may further include one or more of the intermediate selectively read-only overlays 16, 16', 16", 16''', 17 being a topmost overlay 14$_1$, 14$_2$, 14$_3$, 14$_4$, 14$_5$ that has been converted to an intermediate overlay 16, 16', 16", 16''', 17. For example, a topmost overlay 14$_1$, 14$_2$, 14$_3$, 14$_4$, 14$_5$ may be copied and made into a new intermediate overlay mounting point 16, 16', 16", 16''', 17 creating a new mounting point that may or may not be used by any of the clients, including the client that created the copied topmost overlay 14$_1$, 14$_2$, 14$_3$, 14$_4$, 14$_5$. If the client that created the copied topmost overlay 14$_1$, 14$_2$, 14$_3$, 14$_4$, 14$_5$ that became a new intermediate overlay mounting point 16, 16', 16", 16''', 17 now uses that new intermediate overlay as a mounting point 16, 16', 16", 16''', 17 a new topmost overlay 14$_1$, 14$_2$, 14$_3$, 14$_4$, 14$_5$ will be created. In an embodiment, the old topmost overlay 14$_1$, 14$_2$, 14$_3$, 14$_4$, 14$_5$ may be kept and reused by the client whenever it uses a mounting point 16, 16', 16", 16''', 17 which is not the mounting point that was previously used. In other words, as long as the previous mounting point 16, 16', 16", 16''', 17 still exists, any topmost overlay 14$_1$, 14$_2$, 14$_3$, 14$_4$, 14$_5$ that was sitting above it 16, 16', 16", 16''', 17 may be kept and subsequently used by a client 18. As such, a respective topmost overlay 14$_1$, 14$_2$, 14$_3$, 14$_4$, 14$_5$ depends on the client computer 18 and the mounting point 16, 16', 16", 16''', 17 chosen.

In another embodiment, volatile topmost overlays 14$_1$, 14$_2$, 14$_3$, 14$_4$, 14$_5$ are used. In this embodiment, topmost overlays 14$_1$, 14$_2$, 14$_3$, 14$_4$, 14$_5$ are automatically discarded when a client 18 mounts an image from a specific mounting point 16, 16', 16", 16''', 17. The result (and benefit) of this is that the client computers 18 "see" a "clean" disk each time they mount an image from a specific mounting point 16, 16', 16", 16'''. The administrator has the authority to make persistent changes to the disk; and one way to make such changes according to embodiment(s) of the present disclosure is to "commit" a topmost overlay 14$_1$, 14$_2$, 14$_3$, 14$_4$, 14$_5$ into the stack of mounting points 16, 16', 16", 16''', 17 in order to create a new mounting point 16, 16', 16", 16''', 17.

An intermediate overlay 16, 16', 16", 16''', 17 may be created by shutting down the client 18 whose topmost overlay 14$_1$, 14$_2$, 14$_3$, 14$_4$, 14$_5$ is chosen to be inserted in the stack. Then, that topmost overlay 14$_1$, 14$_2$, 14$_3$, 14$_4$, 14$_5$ is committed as an intermediate overlay 16, 16', 16", 16''', 17 (and thus is then potentially available to other clients 18). Using a client 18 that has shut down aids in insuring that the image (mounting point) that corresponds to this new intermediate overlay is consistent and "clean". As such, there is no need to make sure that all the write operations have actually been performed by the client 18. This is much simpler and less expensive when compared to, e.g., techniques that require the use of journalized I/Os for instance. Also, as the image may be a bootable disk, it enables storage of the operating system in the image, generally without concerns that there has been proper shutdown and that the file system on the image has correctly "closed".

The client computers 18 are each able to designate which of the intermediate overlays 16, 16', 16", 16'", 17 is included in the image. In particular, the client computer 18 may specify which mounting point 16, 16', 16", 16'" and/or which additional overlay(s) 17 (if not used as a mounting point) are included in the image. It is to be further understood that each image provides a consistent view of the disk to the particular client computer 18, including any customizations made to the overlays 16, 16', 16", 16'" that make up the respective images. As such, the system administrator and/or the user of the client computer(s) 18 can select which overlay 16, 16', 16", 16'" to use when using the disk, thereby effectively having a different view of the disk depending on the overlay 16, 16', 16", 16'" being used, Selecting which "disk" is available to the client computer 18 may include a list of mounting points 16, 16', 16", 16'" from which the administrator/user may choose before the client computer 18 actually mounts the disk. However, if there is a single mounting point 16, 16', 16", 16'" available to a specific client for a specific stack of mounting points 16, 16', 16", 16'" (upon a specific volume 12), a selection mechanism is not needed.

It is to be understood that a configuration without any intermediate overlay 16, 16', 16", 16'", 17 (for example, as shown in FIG. 1, client 5, represented by the dashed line from the volume 12 directly to the topmost overlay 14$_5$ without intermediate overlay 16 therebetween) is contemplated as being within the purview of the present disclosure. Such a configuration is useful to, e.g., create the level 1 intermediate overlays 16, 16', 16", 16'", 17. As discussed herein, intermediate overlay(s) 16, 16', 16", 16'", 17 are initially created as topmost overlay(s) 14$_1$, 14$_2$, 14$_3$, 14$_4$, 14$_5$ and are then "committed" to the tree 10 as intermediate overlay(s) 16,16',16", 16'",17.

The overlays 16, 16', 16", 16'", 17 can also be stacked such that a system administrator/user may perform incremental changes (i.e., one set of changes per overlay 16, 16', 16", 16'", 17), and then has the ability to revert back to any previous state by changing the overlay 16, 16', 16", 16'", 17 in use.

As such, it is possible for any given client computer 18 to revert any modification back to any previous state. If the user (e.g. the system administrator) of the disk wants to discard some change, he may remove the corresponding overlay, or indicate to the system 10 that this overlay should be ignored. To achieve this, the system 10 allows the user to designate which intermediate overlay to use. This overlay, the overlays below it and the volume 12 then become the image on which the topmost overlay will be created (the image including the topmost (writeable) overlay is referred to herein as the "client image"), effectively giving the respective client computer 18 an image that ignores the latest modifications done on overlays that were located above the selected one.

The system 10 may also include a network N that operatively connects each of the client computers 18 to the volume 12.

It is to be understood that the client computers 18 are configured to read the volume 12 through the respective topmost overlay 14$_1$, 14$_2$, 14$_3$, 14$_4$, 14$_5$, mounting point 16, 16', 16", 16'", and any other intermediate overlays. For example, the second client computer 18 is configured to read the volume 12 via the topmost overlay 14$_2$ and mounting points 16'", 16', and 16. In other words, the entry for accessing the image is the topmost overlay 14$_1$, 14$_2$, 14$_3$, 14$_4$, 14$_5$. The stack of overlays that forms the client image as seen by the client(s) 18 is built from the respective topmost overlay down to the volume 12, with potential intermediate overlays 16, 16', 16", 16'", 17. For the plurality of client computers 18 together, there are several paths (stacks) possible.

Embodiment(s) of the present disclosure further include designating which of the intermediate overlays 16, 16', 16", 16'", 17 is included in a respective image. It is to be understood that the designating may be carried out in any suitable manner and/or via any suitable mechanism.

Some non-limiting examples for representing the tree of images/system 10 include the following.

Conventions for files naming, In an example, the volume 12 is named ImageA.vol. "ImageA" is the name of the base image. A level 1 Overlay is named ImageA_Overlay.1, ImageA_Overlay.2, etc. Level 2 Overlays sitting on the top of ImageA_Overlay.1 would be named ImageA_Overlay.1.1, ImageA_Overlay.1.2, etc. The topmost Overlay would be named the same.

External meta data repository. The links between the files that form the intermediate overlays 16, 16', 16", 16'", 17 are stored in a data repository (e.g., configuration file(s), databases, etc.)

Internal meta data. Each file that represents a Volume 12, an intermediate overlay 16, 16', 16", 16'", 17, or a topmost overlay 14$_1$, 14$_2$, 14$_3$, 14$_4$, 14$_5$ also embeds some meta data that can be used to build the tree of images 10. Typical meta data includes: UID (unique identifier) of the overlay or volume 12, and UID of its father (if any—volumes 12 do not have any father). An "image server" process may then read all the meta data for all the files that form the images (i.e. volume 12 files and intermediate overlay files) and follow the links provided by the "fathers' UIDs" to build the tree of images 10. Each node in the tree of images 10 is a potential "mounting point" 16, 16', 16", 16'" (i.e. an image).

Some non-limiting examples for providing mounting points 16, 16', 16", 16'" (images) to specified clients include the following.

Conventions for file naming. The "image server" process configuration subsystem may create (pre-allocate) the topmost overlay for each client, using a name that would explicitly specify the image (mounting point 16, 16', 16", 16'") to use. For example, the volume 12 is named ImageA.vol. "ImageA" is the name of the base image. A level 1 intermediate Overlay is named ImageA_Overlay.1, ImageA_Overlay.2, etc. Level 2 intermediate Overlays sitting on the top of ImageA_Overlay.1 would be named ImageA_Overlay.1.1, ImageA_Overlay.1.2, etc. The topmost overlay is named so that its father is uniquely specified. For instance, if the father is ImageA_Overlay.1.2, the topmost overlay 14$_1$, 14$_2$, 14$_3$, 14$_4$, 14$_5$ could be named 001122334455@ImageA_Overlay.1.2_Active for a client with hardware address 001122334455. AABBCCDDEEFF@ImageA.vol_Active would specify that the client with hardware address AABBCCDDEEFF uses ImageA.vol without any intermediate overlay. As there may be several existing topmost overlays 14$_1$, 14$_2$, 14$_3$, 14$_4$, 14$_5$ for a given client and a given tree of mounting points 16, 16', 16", 16'", 17, the naming convention would use a unique way of determining which topmost overlay 14$_1$, 14$_2$, 14$_3$, 14$_4$, 14$_5$ actually is to be used. In the example above, the suffix "_Active" is used.

Internal meta data. This is similar to the "file naming convention" above, except that the link to each topmost overlay $14_1, 14_2, 14_3, 14_4, 14_5$ is provided by the "father UID" meta data that would be embedded in the pre-allocated topmost overlay $14_1, 14_2, 14_3, 14_4, 14_5$ for each client. The "image server" process would then build the tree 10 based on the links it reads in all the topmost $14_1, 14_2, 14_3, 14_4, 14_5$ and intermediate overlays 16, 16', 16", 16'", 17. Similarly to the "file naming convention" above, there would be a way to determine which of the topmost overlays $14_1, 14_2, 14_3, 14_4, 14_5$ is the one that determines the mounting point 16, 16',16",16'", 17 to be used for a particular client 18, for instance an "active" bit in the internal meta data.

External meta data repository. The image available to each client 18 or group of clients 18 is recorded in a data repository (e.g., configuration file(s), database). Client identifiers can be, for instance, hardware addresses, UIDs, network address (es), etc. Each client identifier would be linked to the image (i.e. the intermediate overlay 16, 16', 16", 16'", 17 or volume 12) that would be its mounting point in the tree of images 10.

Embodiment(s) of the system 10 may further include tracking contents of sectors in the intermediate overlays 16, 16', 16", 16'", 17, and the volume 12. Non-limiting examples of such tracking include the following. Each overlay (topmost $14_1, 14_2, 14_3, 14_4, 14_5$ or intermediate 16, 16', 16", 16'", 17) contains a list of sectors (index of sectors) that exist in the overlay and the data in the sectors themselves. This may be, for example, a set of two files: an index+context file and a data file. The data file would contain the data in the sectors, and the index file+context file would contain the list of sectors in the data file, the position of each of the sectors in the data file plus context meta data, such as UID of the overlay, UID of its father, etc.

A computer-readable medium 20 according to embodiment(s) of the present disclosure are encoded with a data structure configured to customize mounting points/virtual disks 16, 16', 16", 16'", 17 for at least two client computers 18 via the system 10 as disclosed herein. A respective one of the topmost overlays $14_1, 14_2, 14_3, 14_4, 14_5$ is formed on the image, forming a respective client image, and a respective other one of the topmost overlays $14_1, 14_2, 14_3, 14_4, 14_5$ is formed on a respective other image, forming another client image, etc.

Figure 2:
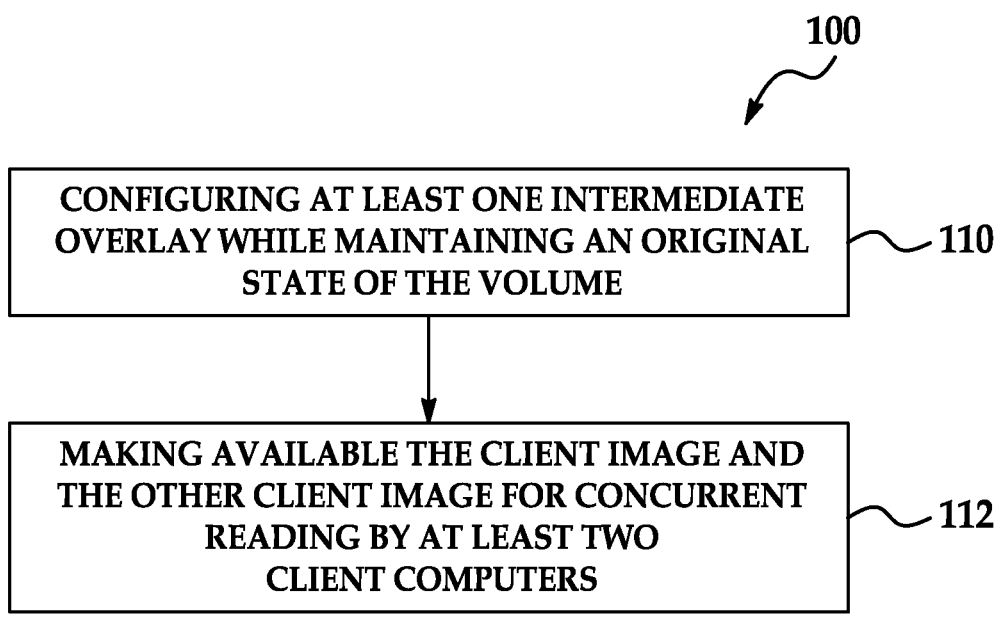
FIG. 2 is a flow diagram depicting an embodiment of a method enabled to be carried out by a data structure encoded in a computer medium.

Referring now to FIG. 2, embodiment(s) of the data structure may be configured to perform embodiment(s) of method 100. At least one of the intermediate overlays 16, 16', 16", 16'", 17 is configurable while maintaining an original state of the volume 12, as designated at box 110. The client image, the other client image, etc, are made available for concurrent reading by the at least two client computers 18, as designated at box 112.

Further embodiment(s) of the data structure may be configured to allow reverting of at least one of the client image or the other client image to a previous state from a modified state. The reverting may include removing at least one modification-containing intermediate overlay 16, 16', 16", 16'", 17 from the client image and/or from the other client image. Alternately, the reverting may include directing the system to ignore the modification-containing intermediate overlay 16,16',16",16'",17. As such, the respective client image(s) is/are reconfigured to include intermediate overlays 16,16', 16",16'",17 below the removed or ignored modification-containing intermediate overlay 16,16',16",16'",17.

If the image is a "system disk" (i.e. contains an operating system), then the client reboots for the modifications to its mounting point 16,16',16",16'",17 to be taken into account. If the image is not a system disk, the client can "unmount" the "old" image and "remount" to another mounting point 16,16', 16",16'",17. The virtual disks could then be seen by the client OS as removable disks, such as, e.g., USB drives. Note that dismounting/remounting could then be done with any other mounting point 16,16',16",16'",17, including a mounting point where at least one intermediate overlay 16,16',16",16'", 17 has been removed or added or even a mounting point that is the son of another volume 12.

The data structure, in yet further embodiment(s) may be configured to allow restoring of the modified state of the respective client image(s). The restoring may include inserting the modification-containing intermediate overlay(s) 16,16',16",16'",17 above the included intermediate overlays 16,16',16",16'",17; or directing the system 10 to include the at least one modification-containing intermediate overlay above the included intermediate overlays. As such, the modification-containing intermediate overlays) is located below at least one of the respective one of the topmost overlay(s) $14_1, 14_2, 14_3, 14_4, 14_5$.

Embodiment(s) of the data structure may further be configured to allow concurrent deploying of information to each of the at least two client computers 18. The deploying may include adding at least one information-containing intermediate overlay (16, 16', 16", 16'", 17) on top of an existing intermediate overlay (16, 16', 16", 16'", 17), the information-containing intermediate overlay(s) (16, 16', 16", 16'" 17) being made available to each of the at least two client computers 18.

Disk sharing as disclosed in embodiment(s) herein provides simple deployment solutions. For example, modifying the base disk/volume 12 once, and then sharing the same image for all clients 18, makes it possible to seamlessly provide the same data to all the clients 18, while changing the disk's content once. It is also possible, if each client has 18 its own copy of the base disk/volume 12, to deploy an overlay (e.g., the at least one information-containing intermediate overlay (16, 16', 16", 16'", 17)) containing modifications to be deployed. It is to be understood that there is/are respective modification-containing overlay(s) per client-disk couple (i.e. per tree/system 10). For example, in the case where there is a second tree 10 (note that the second tree 10 is not connected to the first tree 10) having its volume 12 with its respective overlays, that second tree 10 would receive its own modification-containing overlay(s). In this manner, the deployment is simpler and faster than imaging the whole disk to deploy it on each client location.

It is to be understood that the information-containing intermediate overlay(s) (mounting points/virtual disks) 16, 16', 16", 16'" may include an operating system (OS), and also may be a bootable mounting point. Additionally and/or alternately, the volume 12 may include an operating system (OS)/partial OS and a bootable mounting point.

The data structure, in further embodiment(s), may also be configured to allow storage of a copy of the client image(s) in a separate location therefrom, examples of which include, but are not limited to different partitions, different disks, remote location(s), stored on different kinds of media (DVDs, etc.), and may be directly attached and/or networked. It is to be understood that each of the various data containers (e.g., volume image files, overlays, etc.) described herein may be any non-volatile data container available to the "image server" process, For instance, each data container may be a file (located anywhere the "image server" process can read it), a partition, a set of sectors on a raw disk, etc.

Embodiment(s) of the data structure may further allow selective directing of a respective one of the client computers 18 to boot from the separate location. A suitable configuration interface makes it possible to change the mounting point 16,16',16",16'",17 for clients and to have them mounting their remote disk to the new mounting point at the next boot. Further, the configuration interface would be available to allow a computer 18 to select which image/client image (also referred to herein as a "snapshot") to use. In some configurations, the topmost overlay $14_1$, $14_2$, $14_3$, $14_4$, $14_5$ is erased before the client 18 actually mounts the image ("volatile mode").

The data structure, in further embodiment(s), may be configured to allow eliminating of redundant functionality. The eliminating may include determining if a common sector exists between an upper intermediate overlay 16,16',16",16'", 17 and a lower intermediate overlay 16,16',16",16'",17 or the volume 12; determining if data in the common sector is the same; and if so, eliminating the sector from the upper intermediate overlay 16,16',16",16'",17.

Functionalities may also be consolidated in embodiment(s) of the present disclosure. The consolidating may include merging sectors of the upper intermediate overlay 16,16',16", 16'",17 into the lower intermediate overlay 16,16',16",16'",17 or the volume 12; and/or merging an upper intermediate overlay (16,16',16",16'",17) into a lower intermediate overlay (16, 16',16",16'",17) or the volume (12). The result of the merging is made available to one or more of the client computers 18. Redundant functionality may include, but is not limited to meta data, indexing functions, files, cryptographic keys, etc, As an example, the "stack" of overlays (either one or multiple overlays stacked one above another) provides a consistent image of the disk. If the administrator wants to reduce the disk space used by the overlays, it is possible to merge the change into a lower level. Merges may be done either into the base image 12 (effectively committing the changes to the base image/volume 12, to be shared by all), or into an intermediate overlay 16,16',16",16'",17 (grouping a set of changes into a single overlay). Merges can be done offline (while the system 10 does not use the overlays and the disk 12), or online. This then includes copying data from the upper-level to the lower one. Merging can also be seen as removing a mounting point 16, 16', 16", 16'", 17—if the administrator wants to remove a mounting point 16, 16', 16", 16'", 17 from the stack, he/she discards all the direct sons (and the sons of the sons, etc.) of the mounting point 16,16',16",16'",17 except for one son, and then merges that son and the father (the father equals the mounting point to be removed).

A "defragmentation" process may also be performed along with the "eliminating redundancy" process. Sectors may be reorganized in a specific overlay so that adjacent sectors in the physical data container that is the overlay (files that form the overlay, for instance) are made logically adjacent. For example, if the overlay contained sector 42 and 43 that were not adjacent in the data file for the overlay, they will be made adjacent after the "defragmentation" process has been completed. Furthermore, the indexing (list of sectors in a specific overlay) can be then made more efficient. Instead of storing the fact that the overlay contains sector 42 and 43, originally located at, e.g., offset 1024 and 4096 in the data file and then moved to offset 2048 and 2049 by the defragmentation process, system 10 can store the fact that it contains 2 sectors starting at sector 42, located at offset 2048 in the data file. As can be appreciated, it is more efficient for large numbers of sectors (64 or 128 sectors, for instance).

Some file systems or operating systems often write data that are the same as what is already on the disk (because one of the multiple sectors composing a file has been modified, and the OS does not know how to write this single sector). Then, overlays receiving all written data generally grow with data that may not be needed that is duplicated from an underlying overlay, or from the base disk/disk image 12. It is then possible to use a "compactor" utility according to embodiment(s) herein that will compare the data in the overlay with the data from the underlying level, and remove any duplicate (s). This process can be done offline (while the overlay stack is not in use), or online. If done online, it is done on overlays (intermediate overlays 16,16',16",16'",17) that do not serve for write redirection. This provides the ability for the system 10 to automatically reduce the intermediate overlay size while sharing the disk as usual.

Implementation. Non-limiting embodiment(s) of implementation of the system 10 are as follows.

Tree view: the stack of overlays may be considered as a tree, as mentioned above. The root is the volume 12. Each node 16, 16', 16", 16'", 17 is an intermediate overlay. The leaves are the topmost writeable overlays $14_1$, $14_2$, $14_3$, $14_4$, $14_5$ used by actual computers 18 to store their write operations.

Modified sector list: for each overlay, a list of the sectors it contains will be kept. Keeping track of each modified sector is an efficient way to save data space on the overlays. Modified sectors can then be compared to the underlying sectors during the compacting operation and removed from the upper-level overlays when similar, effectively reducing the overlay's size.

For performance enhancement, the modified sector list of a given overlay may contain the list of modified sectors in the underlying overlays. The sectors from underlying overlays that have not been rewritten in the current overlay will be taken into account. This helps to ensure that when a read operation is performed on an overlay, and the sectors being requested are not in this overlay, the read operation can still be fulfilled by directly accessing the proper file. This generally prevents the overhead of looking in each stacked overlay in turn to find the correct one.

Write mode. By default, the topmost overlay $14_1$, $14_2$, $14_3$, $4_4$, $14_5$ is the system to be read/write enabled. All other (volume 12 and intermediate overlays 16, 16', 16",16'", 17) are read-only (except during merge operations). When performing a "merge" for instance, the target of the merge operation (i.e., the file where the merged data will be written, be it an intermediate overlay 16, 16', 16", 16'", 17 or the base volume 12) is made writeable, and the data is written to it by the merge operation. This is done in background, the topmost overlay(s) receiving the write operations and potentially redirecting them to the target file. As such, read operations may still be done on the topmost overlay $14_1$, $14_2$, $14_3$, $14_4$, $14_5$, and data can be read from any overlay in the stack, including the one being merged.

"OS/Disk streaming". When used with a virtual disk system that shares (streams) virtual disks to remote clients, embodiment(s) of the present disclosure may be useful for applying and deploying patches/changes to an existing virtual disk. One of the particularities of shared streamed virtual disks is that, generally, the clients dynamically adapt their "private" data on the fly (computer name, domain identifiers, for instance). However, with embodiment(s) of the system 10 herein, a streamed share virtual disk is really shared, and there is no extra "customization step" (such as sysprep operations) that is done after a change has been made to a virtual disk.

When using embodiment(s) of the present disclosure, the administrator can make the desired changes to the shared virtual disk 16,16',16",16'",17 from one client 18 that mounted the virtual disk in non-volatile mode--the modifications are stored in an overlay that is, by default, available to this client and that are kept even after the client rebooted.

When the modifications are validated, the administrator shuts down the client 18 and then makes the overlay an intermediate/topmost common overlay for all the desired clients 18. The desired clients 18 will then "see" a modified disk, with all the modifications made previously, as soon as they reboot.

Modifying a shared virtual disk is then relatively simple, and concurrent deploying of modifications to a virtual disk is almost immediate—add the new overlay to the stack of intermediate overlays, make the client mounting point above this new overlay, and the client(s) will then take into account their new "logical disk" (formed from a base disk image 12 and a stack of intermediate overlays) after they dismounted and remounted the virtual disk again (if the virtual disk contains an OS, dismounting/remounting usually calls for the client to reboot). It is to be understood that, "almost immediate" includes the time to rename a file (a few nanoseconds), or to copy a file (up to several minutes), plus the time to make the changes in the server's data structures, up to about 1 minute. Then the clients need to reboot, up to about 5 minutes.

Reverting to a previous "version" of the disk is also relatively simple—the administrator changes the mounting point for the client(s) 18 that are currently using a particular overlay so that their mounting point becomes a previous layer. When no more clients are using the overlay that has been "discarded", the administrator may delete the file(s) corresponding to that overlay.

Using embodiment(s) of the present disclosure with virtual machines, for example in VDI (virtual desktop infrastructure) environments, is generally more reliable and easier to use than "linked clones". Instead of having a single/common base for all the client virtual machines (VMs), the clients can have several paths/mounting points to connect to. Further, embodiment(s) of the present disclosure make it possible to share several snapshots/images of a single virtual disk among several VMs at the same time.

Advantages described herein relative to "OS/Disk Streaming" may be applicable to networked/shared storage systems, if the "Disk Service" can implement the stacked overlays feature described herein. As discussed above, an interface makes it possible to change the mounting point for clients and to have them mounting their remote disk to a new mounting point at the next boot. Further, embodiment(s) disclosed herein may be useful with workstations that boot off a networked storage.

In contrast to prior systems that attempted to make the images available "at any time" and the snapshots/images to be recorded at any moment, embodiment(s) of the present disclosure record/commit the overlays when a client has been shut down or has dismounted the virtual disk. As such (as discussed above), the present embodiment(s) offer a simpler and more economic way to provide virtual disks 16,16',16", 16''',17 version control, in contrast to solutions that call for the use of a journalized system to be able to redo/undo the changes in one particular snapshot. Furthermore, embodiment(s) of the present disclosure provide "sharable version control" for bootable (system) disks, which is generally considered impossible (e.g., because of too much meta data that is different from one system drive to the other, including unique IDs, computer name, etc.). Without being bound to any theory, it is believed that using unique "per client" writable topmost overlays enables this "sharable" feature.

Embodiment(s) of the system 10 disclosed herein have many advantages, some of which include rendering it possible to share a single disk or disk image between multiple client computers, e.g., through a network N. It is then possible to have a single disk to manage for all the computers on the network, effectively reducing, e.g., the administration needed on the clients. Each client computer 18 can have its own dedicated stack of overlays (e.g., containing client specific customization done by the administrator), and each client computer also shares the same base volume 12, and at least some intermediate overlays (as desired).

While several embodiments have been described in detail, it will be apparent to those skilled in the art that the disclosed embodiments may be modified. Therefore, the foregoing description is to be considered exemplary rather than limiting.

What is claimed is:

1. A system for virtual disks version control, comprising;
    a selectively read-only volume;
    at least two intermediate, selectively read-only overlays configured as at least two mounting points, one of the at least two mounting points and the volume forming an image, and the other of the at least two mounting points and the volume forming an other image; and
    at least one topmost overlay configured to store the results of redirected write operations, the at least two intermediate overlays being operatively located between the volume and the at least one topmost overlay, each of the at least two mounting points configured to enable a plurality of client computers to concurrently read the image or the other image and to concurrently write to a respective one of the at least one topmost overlays.

2. The system as defined in claim 1, further comprising at least an additional intermediate overlay operatively located between the volume and the at least one topmost overlay wherein the at least an additional intermediate overlay forms part of the image or the other image.

3. The system of claims 1 wherein the system further comprises:
    at least one of the intermediate selectively read-only overlays being a converted topmost overlay ; and
    at least a second topmost overlay.

4. The system of claim 1 further comprising means for designating which of the intermediate overlays is included in the image, the other image, or the at least a third image.

5. The system of claim 1 further comprising a network (N) operatively connecting each of the plurality of client computers to at least one of the image or the other image.

6. The system of claim 1 further comprising means for tracking contents of sectors in the intermediate overlays and in the volume.

7. A non-transitory computer-readable medium encoded with a data structure configured to customize virtual disks for at least two client computers via a system including;
    a selectively read-only volume;
    at least two intermediate, selectively read-only overlays configured as at least two mounting points, one of the at least two mounting points and the volume forming an image, and the other of the at least two mounting points and the volume forming an other image; and
    at least one topmost overlay configured to store the results of redirected write operations, the at least two intermediate overlays being operatively located between the volume and the at least one topmost overlay, each of the at least two mounting points configured to enable a plurality of client computers to concurrently read the image or the other image;
    wherein a respective one of the at least one topmost overlay is formed on the image, forming a writeable client image, and a respective other one of the at least one topmost overlay is formed on the other image, forming an other writeable client image, and wherein the data structure is configured to perform the following steps:

configuring at least one of the intermediate overlays while maintaining an original state of the volume; and making available the client image and the other client image for concurrent reading and writing by the at least two client computers.

8. The computer-readable medium as defined in claim 7 wherein the data structure is further configured to:

allow reverting of at least one of the client image or the other client image to a previous state from a modified state, the reverting including:

removing at least one modification-containing intermediate overlay from the at least one of the client image or the other client image; or directing the system to ignore the at least one modification-containing intermediate overlay;

thereby reconfiguring the at least one of the client image or the other client image to include intermediate overlays below the removed or ignored modification-containing intermediate overlay.

9. The computer-readable medium as defined in claim 8 wherein the data structure is further configured to:

allow restoring of the modified state of the at least one of the client image or the other client image, the restoring including:

inserting the at least one modification-containing intermediate overlay above the included intermediate overlays; or directing the system to include the at least one modification-containing intermediate overlay above the included intermediate overlays;

whereby the at least one modification-containing intermediate overlay is located below at least one of the respective one of the at least one topmost overlay or the respective other one of the at least one topmost overlay.

10. The computer-readable medium of claim 7 wherein the data structure is further configured to:

allow concurrent deploying of information to each of the at least two client computers the deploying including:

adding at least one information-containing intermediate overlay on top of an existing intermediate overlay, the at least one information-containing intermediate overlay being made available to each of the at least two client computers.

11. The computer-readable medium as defined in claim 10 wherein the at least one information-containing intermediate overlay configured as one of the at least two mounting points includes an operating system (OS).

12. The computer-readable medium as defined in claim 11 wherein the at least one information-containing intermediate overlay configured as one of the at least two mounting points comprises a bootable mounting point.

13. The computer-readable medium of claim 7 wherein the data structure is further configured to:

allow storage of a copy of at least one of the client image or the other client image in a separate location therefrom; and allow selective directing of the at least a respective one of the at least two client computers to boot from the separate location.

14. The computer-readable medium of claim 7 wherein the data structure is further configured to:

allow eliminating of redundant functionality, the eliminating including:

determining if a common sector exists between an upper intermediate overlay and a lower intermediate overlay or the volume;

determining if data in the common sector is the same; and if so, eliminating the sector from the upper intermediate overlay.

15. The computer-readable medium of claim 7 wherein the data structure is further configured to:

allow consolidating of functionality, the consolidating including:

merging sectors of an upper intermediate overlay into the lower intermediate overlay or the volume; or merging the upper intermediate overlay into the lower intermediate overlay or the volume;

the result of the merging being available to at least one of the at least two client computers.

* * * * *

UNITED STATES PATENT AND TRADEMARK OFFICE
CERTIFICATE OF CORRECTION

PATENT NO. : 8,667,246 B2
APPLICATION NO. : 13/320272
DATED : March 4, 2014
INVENTOR(S) : Julien Rope et al.

Page 1 of 1

It is certified that error appears in the above-identified patent and that said Letters Patent is hereby corrected as shown below:

In the Claims

In column 12, line 12, in Claim 1, delete "comprising;" and insert -- comprising: --, therefor.

In column 12, line 22, in Claim 1, delete "overlay ," and insert -- overlay, --, therefor.

In column 12, line 29, in Claim 2, delete "overlay" and insert -- overlay, --, therefor.

In column 12, line 32, in Claim 3, delete "claims" and insert -- claim --, therefor.

In column 12, line 35, in Claim 3, delete "overlay ;" and insert -- overlay; --, therefor.

In column 12, line 48, in Claim 7, delete "including;" and insert -- including: --, therefor.

In column 13, line 39, in Claim 10, delete "computers" and insert -- computers, --, therefor.

In column 14, line 23, in Claim 14, delete "eliminating" and insert -- eliminating --, therefor.

Signed and Sealed this
Twenty-fourth Day of June, 2014

Michelle K. Lee
*Deputy Director of the United States Patent and Trademark Office*